(12) United States Patent
Nagase et al.

(10) Patent No.: US 8,368,343 B2
(45) Date of Patent: Feb. 5, 2013

(54) MOTOR CONTROL DEVICE

(75) Inventors: Shigeki Nagase, Nabari (JP); Takeshi Ueda, Kashiba (JP); Yuji Kariatsumari, Yamatotakada (JP); Hiroshi Sumasu, Kashihara (JP)

(73) Assignee: JTEKT Corporation, Osaka (JP)

( * ) Notice: Subject to any disclaimer, the term of this patent is extended or adjusted under 35 U.S.C. 154(b) by 210 days.

(21) Appl. No.: 12/736,320

(22) PCT Filed: Feb. 18, 2009

(86) PCT No.: PCT/JP2009/000684
§ 371 (c)(1),
(2), (4) Date: Sep. 29, 2010

(87) PCT Pub. No.: WO2009/122647
PCT Pub. Date: Oct. 8, 2009

(65) Prior Publication Data
US 2011/0018487 A1    Jan. 27, 2011

(30) Foreign Application Priority Data

Mar. 31, 2008    (JP) .................................. 2008-092801

(51) Int. Cl.
*H02P 27/00*    (2006.01)
(52) U.S. Cl. .................................. 318/800; 318/400.02
(58) Field of Classification Search ............. 318/400.02, 318/800
See application file for complete search history.

(56) References Cited

U.S. PATENT DOCUMENTS

| | | | |
|---|---|---|---|
| 5,854,547 A * | 12/1998 | Nakazawa | .................. 318/716 |
| 2001/0005121 A1 * | 6/2001 | Sakamaki | .................. 318/727 |
| 2007/0222409 A1 | 9/2007 | Kariatsumari et al. | |
| 2008/0097260 A1 * | 4/2008 | Tsukada et al. | ................. 601/98 |
| 2008/0197799 A1 * | 8/2008 | Tomigashi | ................... 318/768 |

FOREIGN PATENT DOCUMENTS

| | | |
|---|---|---|
| CN | 1148753 A | 4/1997 |
| JP | 10-147249 A | 6/1998 |
| JP | 2000-184773 A | 6/2000 |
| JP | 2001-187578 A | 7/2001 |
| JP | 2004-351983 A | 12/2004 |
| JP | 2006-197718 A | 7/2006 |
| JP | 2007-082325 A | 3/2007 |
| JP | 2007-259603 A | 10/2007 |

* cited by examiner

*Primary Examiner* — Walter Benson
*Assistant Examiner* — Bryan Gordon
(74) *Attorney, Agent, or Firm* — Rabin & Berdo, P.C.

(57) ABSTRACT

A motor control device of the present invention includes: target electric current value setting units (15 and 16) that set target electric current values that should be supplied to a motor (1), basic voltage value computing units (511, 521, 51*a*, and 52*a*) that compute basic voltage values for driving the motor, a rotation angle speed computing unit (23) that computes a rotation angle speed of the motor, correction value computing units (50, 512, 515, 516, 522, 525, and 526) that compute correction values for correcting the basic voltage values based on motor electric current values and a rotation angle speed of the motor, correcting units (513 and 523) that obtain voltage command values by correcting the basic voltage values by the correction values computed by the correction value computing units, and a driving unit (13) that drives the motor by using voltage command values. The correction value computing units include correction value smoothing units (50, 515, 516, 525, and 526) for obtaining smoothed correction values.

10 Claims, 12 Drawing Sheets

MOTOR CONTROL DEVICE

TECHNICAL FIELD

The present invention relates to a motor control device for driving a motor (specifically, a brushless motor). A brushless motor is used as, for example, a source of a steering assist force in an electric power steering apparatus.

BACKGROUND ART

A motor control device for a brushless motor includes an electric current detecting section, a rotating position detecting section, a dq-axis target electric current value computing section, a dq-axis electric current computing section, a d-axis voltage command value computing section, and a q-axis voltage command value computing section. The electric current detecting section detects an electric current flowing in an armature coil of a motor. The rotating position detecting section detects a rotor rotating position of the motor. The dq-axis target electric current value computing section computes a d-axis target electric current value and a q-axis target electric current value. The dq-axis electric current computing section obtains a d-axis electric current and a q-axis electric current based on an armature coil electric current and a rotor rotating position. The d-axis voltage command value computing section obtains a d-axis voltage command value based on PI computation on a d-axis deviation between the d-axis target electric current value and the d-axis electric current so as to reduce the d-axis deviation. The q-axis voltage command value computing section obtains a q-axis voltage command value based on PI computation of a q-axis deviation between the q-axis target electric current value and the q-axis electric current so as to reduce the q-axis deviation. Based on the d-axis voltage command value and the q-axis voltage command value thus obtained and the detected rotor rotating position, the motor control device applies a voltage to the armature coil. Accordingly, a rotor torque is generated.

On the other hand, non-interference control in which a non-interference control amount is added to a PI computation value is known (refer to US 2001/0005121A1). Non-interference control is control for determining a voltage command value so as to compensate a speed electromotive force generated inside the motor due to the rotation of the rotor. It is expected that the non-interference control will effectively reduce deterioration in responsiveness and following capability caused by a speed electromotive force.

DISCLOSURE OF THE INVENTION

Problem to be Solved by the Invention

The speed electromotive force generated inside the motor depends on the rotation angle speed and the electric current. Therefore, a non-interference control amount for compensating the speed electromotive force also depends on the rotation angle speed and the electric current. In detail, a d-axis non-interference control amount depends on the rotation angle speed and a q-axis electric current, and a q-axis non-interference control amount depends on the rotation angle speed and the d-axis electric current.

However, the rotation angle speed is calculated based on an output signal of the rotating position detecting section, and the motor electric current value is obtained from a result of detection by the electric current detecting section, and therefore, these contain high-frequency noise. As a result, high-frequency noise is also contained in the non-interference control amount. This high-frequency noise causes vibrations and abnormal noise, and may provide a user of an electric power steering apparatus with a feeling of physical disorder and degrades the feeling in steering.

Therefore, an object of the present invention is to provide a motor control device that can reduce vibrations and abnormal noise.

Means for Solving the Problem

A motor control device of the present invention includes: a target electric current value setting unit (15, 16) that sets a target electric current value to be supplied to a motor (1), a basic voltage value computing unit (511, 521, 51a, 52a) that computes a basic voltage value for driving the motor, a rotation angle speed computing unit (23) that computes a rotation angle speed of the motor, a correction value computing unit (50, 512, 515, 516, 522, 525, 526) that computes a correction value for correcting the basic voltage value based on a motor electric current value and a rotation angle speed computed by the rotation angle speed computing unit, a correcting unit (513, 523) that obtains a voltage command value by correcting the basic voltage value computed by the basic voltage value computing unit by the correction value computed by the correction value computing unit, and a driving unit (13) that drives the motor by using a voltage command value obtained by the correcting unit, wherein the correction value computing unit includes a correction value smoothing unit (50, 515, 516, 525, 526) for obtaining a smoothed correction value. Alphanumeric characters in parentheses indicate corresponding components in the preferred embodiments described later; however, this does not mean that the present invention is limited to the preferred embodiments.

According to this configuration, a basic voltage value for driving the motor is set based on a target electric current value. The target electric current value corresponds to a torque that should be generated from the motor, so that the basic voltage value corresponds to a voltage value to be applied to the motor for generating the target torque. On the other hand, based on a motor electric current value and a rotation angle speed, a correction value for correcting the basic voltage values is computed. The correction value is smoothed according to an operation of the correction value smoothing unit. By correcting the basic voltage value by the smoothed correction value, a voltage command value is obtained. The motor is driven with the voltage command value. Thus, the basic voltage value is corrected by a correction value of which high-frequency components are reduced, so that vibrations and abnormal noise can be reduced.

The motor electric current value to be used for computing the correction value may be a target electric current value or a detected electric current value detected by an electric current detecting unit (11).

The correction value computing unit may compute a correction value for non-interference control of the motor. According to this configuration, while reducing vibrations and abnormal noise, the responsiveness and following capability of the motor can be improved by non-interference control without depending on the rotation angle speed and the motor electric current value.

In detail, the basic voltage value computing unit may compute a d-axis basic voltage value $V_{dbase}$ and a q-axis basic voltage value $V_{qbase}$ according to the following equations A1 and B1. In this case, preferably, the correction value computing unit computes a d-axis correction value $D_d$ for correcting the d-axis basic voltage value $V_{dbase}$ according to the following equation A2, and computes a q-axis correction value $D_q$ for correcting the q-axis basic voltage value $V_{qbase}$ according to the following equation B2. The voltage command values $V_d^*$ and $V_q^*$ are given by the following equations A and B.

$$V_d^* = V_{dbase} + D_d \quad (A)$$

$$V_q^* = V_{dbase} + D_q \quad (B)$$

$$V_{dbase} = (R + PL_d) \cdot I_d^* \quad (A1)$$

$$V_{qbase} = (R + PL_q) \cdot I_q^* \quad (B1)$$

$$D_d = -\omega L_q \cdot I_q^* \quad (A2)$$

$$D_q = \omega L_d \cdot I_d^* + \omega \phi \quad (B2)$$

R represents an armature coil resistance ($\Omega$), P represents a differential operator, $\omega$ represents a rotation angle speed (rad/sec) of the motor, $L_d$ represents a d-axis self-inductance (H), $L_q$ represents a q-axis self-inductance (H), $I_d^*$ represents a d-axis target electric current value (A), $I_q^*$ represents a q-axis target electric current value (A), and $\phi$ represents $\sqrt{(3/2)}$ times of maximum numbers of interlinkage fluxes of U-phase, V-phase, and W-phase armature coils.

When an electric current detecting unit that detects motor electric current values is provided, in the computations of the d-axis correction value $D_d$ and the q-axis correction value $D_q$ according to the equations A2 and B2, a detected d-axis motor electric current value $I_d$ and a detected q-axis motor electric current value $I_q$ may be used instead of the target electric current values $I_d^*$ and $I_q^*$.

The basic voltage value computing unit preferably includes a basic voltage value smoothing unit (514, 524, 51*a*, 52*a*) for Obtaining a smoothed basic voltage value.

According to this configuration, not only the correction value but also the basic voltage value are smoothed. Accordingly, vibrations and abnormal noise to be caused by fluctuations of the target electric current value can also be reduced. Therefore, vibrations and abnormal noise can be more effectively reduced.

The cut-off frequency of the basic voltage value smoothing unit is preferably lower than the cut-off frequency of the correction value smoothing unit.

In this configuration, the cut-off frequency of smoothing to be applied to the basic voltage value is comparatively low, so that vibrations and abnormal noise to be caused by fluctuations of target electric current values can be effectively reduced. On the other hand, the cut-off frequency of smoothing to be applied to a correction value is comparatively high, so that the correction value become a value from which high-frequency noise is removed in a state where sufficient responsiveness to fluctuations of the rotation angle speed is secured. Thus, the basic voltage value and correction value become properly smoothed values, so that both of reduction of vibrations and abnormal noise and securement of responsiveness can be realized.

In detail, responsiveness necessary for generating a torque from the motor and responsiveness necessary for control depending on the rotation angle speed such as non-interference control are different from each other. Therefore, the cut-off frequency of smoothing to be applied to a basic voltage value is set to be comparatively low so that responsiveness required for a motor torque is obtained. On the other hand, the cut-off frequency of smoothing to be applied to a correction value (non-interference control amounts, etc.) is set to be comparatively high so that responsiveness required for non-interference control, etc., (responsiveness capable of following fluctuations of the rotation angle speed) is obtained. Accordingly, for example, without sacrificing the effect of non-interference control, that is, in a state where responsiveness and following capability of the motor are secured without depending on the rotation angle speed and the motor electric current values, vibrations, etc., can be reduced.

The basic voltage value smoothing unit may includes a target electric current value smoothing unit (514, 524, 51*a*, 52*a*) that smoothes the target electric current value set by the target electric current value setting unit. According to this configuration, by smoothing the target electric current value, a smoothed basic voltage value can be obtained as a result. Of course, after the basic voltage value is obtained by using target electric current value that is not smoothed, the basic voltage value may be smoothed, or smoothing may be performed concurrently with the process of obtaining the basic voltage value.

The correction value smoothing unit may include the electric current value smoothing unit (515, 525) that smoothes the motor electric current value. According to this configuration, by smoothing the motor electric current value, a smoothed correction value can be obtained as a result. Of course, after a correction value is obtained by using the motor electric current value that is not smoothed, the correction value may be smoothed.

The correction value smoothing unit may include a rotation angle speed smoothing unit (50) that smoothes a rotation angle speed computed by the rotation angle speed computing unit. According to this configuration, by smoothing the rotation angle speed, a smoothed correction value can be obtained as a result. Of course, after a correction value is obtained by using a rotation angle speed that is not smoothed, the correction value may be smoothed.

The basic voltage value computing unit and the correction value computing unit preferably constitute an open-loop control operation unit that obtains a basic voltage value and a correction value based on a motor circuit equation.

The basic voltage values based on the motor circuit equations (the equations A and B given above) are expressed by, for example, the equations A1 and B1 given above. In this case, correction values based on the motor circuit equations are expressed by, for example, the equations A2 and B2 given above.

In the case of open loop control operation, an electric current detecting unit that detects motor electric currents is not necessary, so that the cost can be reduced. In the open loop control operation, vibrations and abnormal noise are easily caused by, in particular, influence from fluctuations of a target electric current value, so that by adopting the above-described configuration in which smoothing, etc., are applied to the basic voltage value, vibrations and abnormal noise can be effectively reduced.

Of course, a configuration of feed-back control is also possible. In detail, a configuration is employed in which an electric current detecting unit that detects a motor electric current value and generates a detected electric current value is provided, and by performing PI (proportional integration) control for the deviation between the target electric current value and the detected electric current value, a basic voltage value is computed. In this case, by an integral element in the PI control, an effect of smoothing the target electric current value is obtained.

The above-described and other advantages, features, and effects of the present invention will become more apparent from the following description of preferred embodiments with reference to the attached drawings.

DESCRIPTION OF THE REFERENCE NUMERALS

1: motor, 2: resolver, 10, 10A: motor control device, 11: electric current detecting section, 12: microcomputer, 50: angle speed low-pass filter, 51, 51A: d-axis voltage command value computing section, 511: d-axis basic voltage value computing section, 512: d-axis non-interference control amount computing section, 513: d-axis adder section, 514: first d-axis low-pass filter, 515: second d-axis low-pass filter, 516: third d-axis low-pass filter, 51$a$: d-axis PI computing section, 52, 52A: q-axis voltage command computing section, 521: q-axis basic voltage value computing section, 522: q-axis non-interference control amount computing section, 523: q-axis adder section, 524: first q-axis low-pass filter, 525: second q-axis low-pass filter, 526: third q-axis low-pass filter, 52$a$: q-axis PI computing section

BEST MODE FOR CARRYING OUT THE INVENTION

Figure 1:
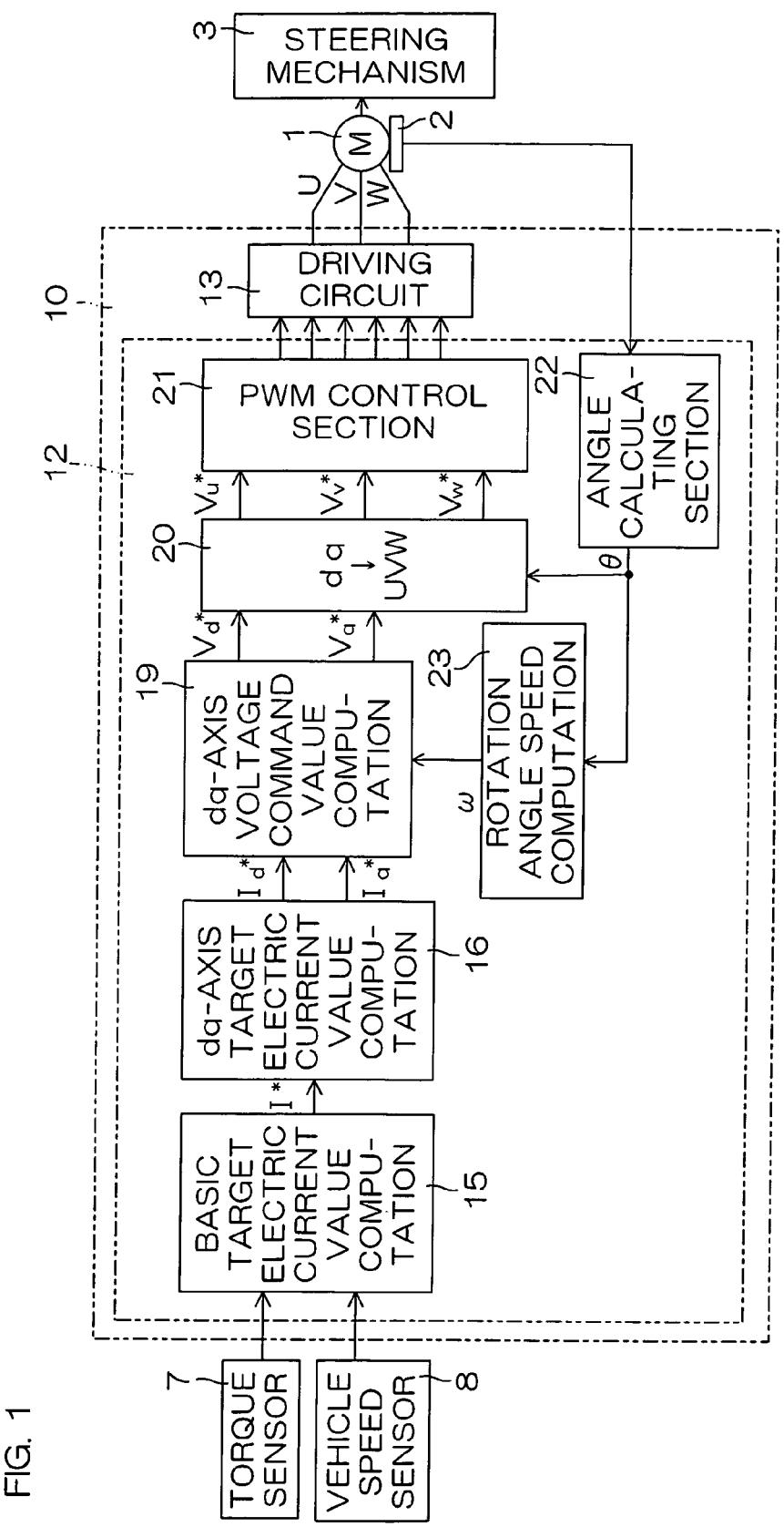
FIG. 1 is a block diagram for describing an electric configuration of an electric power steering apparatus to which a motor control device according to a preferred embodiment of the present invention is applied.

FIG. 1 is a block diagram for describing an electric configuration of an electric power steering apparatus to which a motor control device according to a preferred embodiment of the present invention is applied. This electric power steering device includes a torque sensor 7 that detects a steering torque to be applied to a steering wheel of a vehicle, a vehicle speed sensor 8 that detects a speed of the vehicle, a motor 1 that gives a steering mechanism 3 of the vehicle a steering assist force, and a motor control device 10 that controls driving of the motor 1. The motor control device 10 realizes proper steering assisting according to a steering status by driving the motor 1 according to a steering torque detected by the torque sensor 7 and a vehicle speed detected by the vehicle speed sensor 8. The motor 1 is, for example, a three-phase brushless DC motor.

The motor control device 10 includes a microcomputer 12 as a signal processing section and a driving circuit 13. To this motor control device 10, a resolver 2 (rotating position sensor) that detects a rotating position of the rotor inside the motor 1, the torque sensor 7, and the vehicle speed sensor 8 are connected.

The microcomputer 12 includes a plurality of functional processing sections to be realized by program processing (software processing). The plurality of functional processing portions include a basic target electric current value computing section 15, a dq-axis target electric current value computing section 16, a dq-axis voltage command value computing section 19 (open loop control operation section), a voltage command value coordinate transformation section 20, a PWM (pulse width modulation) control section 21, an angle calculating section 22, and a rotation angle speed computing section 23.

The driving circuit 13 includes an inverter circuit, and is controlled by the PWM control section 21 to supply electric power from a power supply such as an on-board battery to U-phase, V-phase, and W-phase armature coils of the motor 1.

The angle calculating section 22 calculates a rotation angle (electric angle) $\theta$ of the rotor of the motor 1 based on a rotating position detected by the resolver 2. The rotation angle speed computing section 23 (rotation angle speed computing unit) calculates a rotation angle speed $\omega$ (rad/sec) of the rotor by time-differentiating a rotation angle $\theta$ calculated by the angle calculating section 22.

The basic target electric current value computing section 15 computes a basic target electric current value I* of the motor 1 based on a steering torque detected by the torque sensor 7 and a vehicle speed detected by the vehicle sensor 8. The basic target electric current value I* is determined so as to become larger as the steering torque becomes larger, and become larger as the vehicle speed becomes slower.

The basic target electric current value I* computed by the basic target electric current value computing section 15 is input into the dq-axis target electric current value computing section 16. The dq-axis target electric current value computing section 16 computes a d-axis target electric current value $I_d^*$ for generating a magnetic field in the d-axis direction and a q-axis target electric current value $I_q^*$ for generating a magnetic field in the q-axis direction. The d-axis is along the magnetic flux direction of a field of the rotor of the motor 1, and the q-axis is orthogonal to the d-axis and the rotor rotational axis. The computations in the dq-axis target electric current value computing section 16 can be performed by using known computing equations. The basic target electric current computing section 15 and the dq-axis target electric current value computing section 16 corresponds to a target electric current value setting unit.

The dq-axis voltage command value computing section 19 obtains a d-axis voltage command value $V_d^*$ and a q-axis voltage command value $V_q^*$ based on a d-axis target electric current value $I_d^*$ and a q-axis target electric current value $I_q^*$ obtained by the dq-axis target electric current value computing section 16 and a rotation angle speed $\omega$ obtained by the rotation angle speed computing section 23. The dq-axis voltage command value computing section 19 corresponds to an open loop control operation unit that sets a d-axis voltage command value $V_d^*$ and a q-axis voltage command value $V_q^*$ based on circuit equations ((3) and (6) described below) of the motor 1.

The voltage command value coordinate transformation section 20 performs coordinate transformation of the d-axis voltage command value $V_d^*$ and the q-axis voltage command value $V_q^*$ based on the rotation angle θ calculated by the angle calculating section 22 to compute applied voltage command values Vu*, Vv*, and Vw* that should be applied to the U-phase armature coil, the V-phase armature coil, and the W-phase armature coil, respectively. The computations in the voltage command value coordinate transformation section 20 are performed by using known computing equations.

The PWM control section 21 generates PWM control signals of the respective phases as pulse signals having duty ratios corresponding to the applied voltage command values Vu*, Vv*, and Vw*. Accordingly, voltages corresponding to the d-axis voltage command value $V_d^*$ and the q-axis voltage command value $V_q^*$ are applied to the armature coils of the phases from the driving circuit 13 to generate a rotor rotating force.

Figure 2:
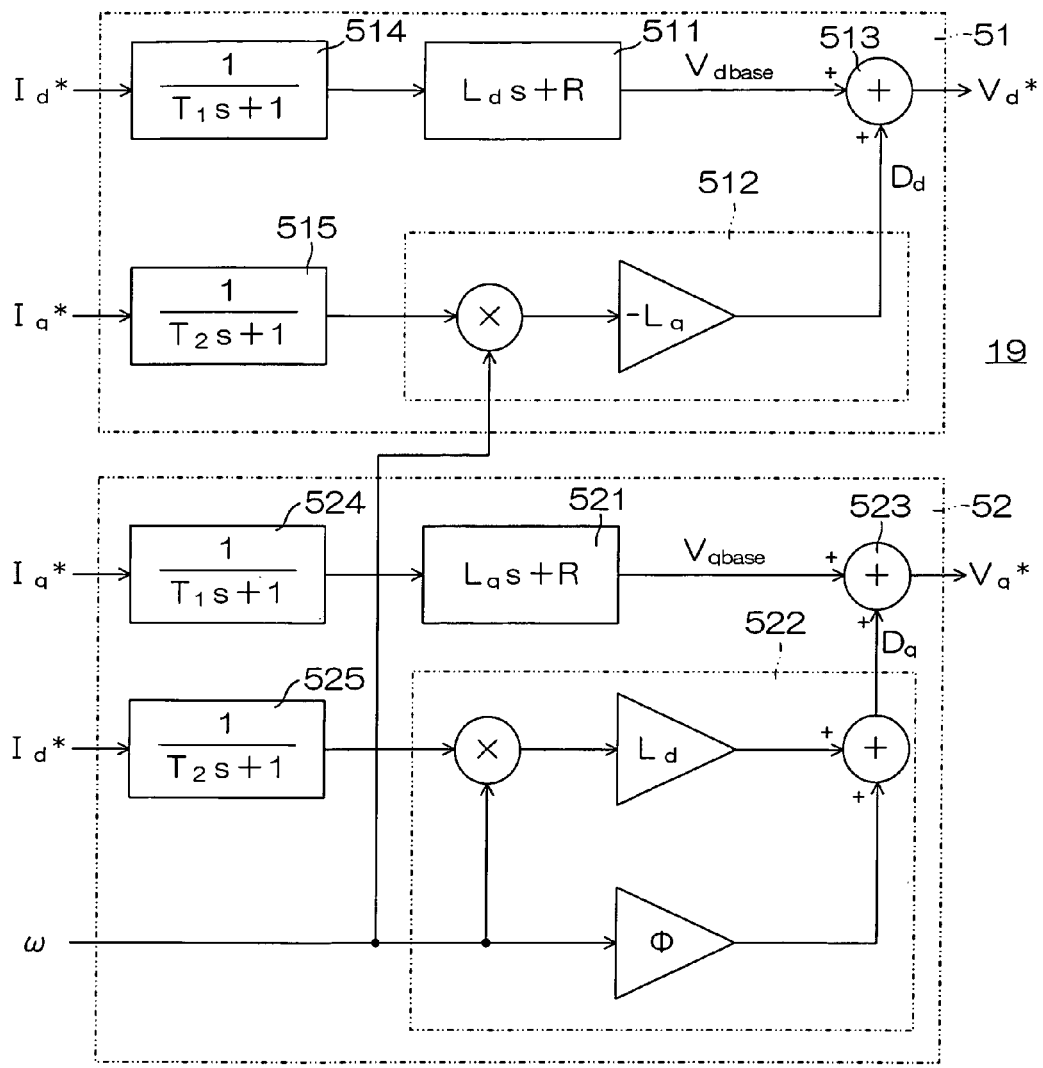
FIG. 2 is a block diagram for describing a detailed configuration of a dq-axis voltage command value computing section.

FIG. 2 is a block diagram for describing a detailed configuration of a dq-axis voltage command value computing section 19. The dq-axis voltage command value computing section 19 includes a d-axis voltage command value computing section 51 and a q-axis voltage command value computing section 52.

The d-axis voltage command value computing section 51 includes a d-axis basic voltage value computing section 511 (basic voltage value computing unit), a d-axis non-interference control amount computing section 512, a d-axis adder section 513 (correcting unit), a first d-axis low-pass filter 514 (target electric current value smoothing unit, basic voltage value smoothing unit), and a second d-axis low-pass filter 515 (electric current value smoothing unit, correction value smoothing unit). The d-axis non-interference control amount computing section 512 and the second d-axis low-pass filter 515 corresponds to a correction value computing unit that obtains a smoothed correction value (d-axis non-interference control amount $D_d$).

The first d-axis low-pass filter 514 removes high-frequency components (high-frequency noise) of the d-axis target electric current value $I_d^*$. The first d-axis low-pass filter 514 may include, for example, a first-order lag element $(1/(T_1 s+1))$. $T_1$ represents a time constant, s represents a Laplace operator. The cut-off frequency $\omega_{c1}=1/T_1$. The cut-off frequency $\omega_{c1}$ is equal to or lower than the cut-off frequency of a low-pass filter (not shown) installed in the torque sensor 7. In detail, for example, the cut-off frequency $\omega_{c1}$ is set to be equivalent to (for example, approximately 50 Hz) an electric time constant of the motor 1.

The second d-axis low-pass filter 515 removes high-frequency components (high-frequency noise) of the q-axis target electric current value $I_q^*$. The second d-axis low-pass filter 515 may include, for example, a first-order lag element $(1/(T_2 s+1))$. $T_2$ represents a time constant. The cut-off frequency $\omega_{c2}=1/T_2$. The cut-off frequency $\omega_{c2}$ is higher than the cut-off frequency of the first d-axis low-pass filter 514, and set to, for example, approximately 100 Hz.

The d-axis basic voltage value computing section 511 computes a d-axis basic voltage value $V_{dbase}$ corresponding to a torque that should be generated from the motor 1 according to the following equation (1) based on the d-axis target electric current value $I_d^*$ smoothed by the first d-axis low-pass filter 514. R represents an armature coil resistance (Ω), P represents a differential operator, $L_d$ represents a d-axis self-inductance, and these are known parameters.

$$V_{dbase}=(R+PL_d) \cdot \qquad (1)$$

The d-axis non-interference control amount computing section 512 computes a d-axis non-interference control amount $D_d$ (correction value for correcting the d-axis basic voltage value $V_{dbase}$) according to the following equation (2) based on a q-axis target electric current value $I_q^*$ smoothed by the second d-axis low-pass filter 515 and a rotation angle speed ω obtained by the rotation angle speed computing section 23. $L_q$ represents a q-axis self-inductance.

$$D_d = -\omega L_q \cdot I_q^* \qquad (2)$$

The d-axis adder section 513 obtains a d-axis voltage command value $V_d^*$ of the following equation (3) by adding the d-axis non-interference control amount $D_d$ to the d-axis basic voltage value $V_{dbase}$ (that is, correcting the d-axis basic voltage value $V_{dbase}$ by the d-axis non-interference control amount $D_d$).

$$V_d^* = V_{dbase} + D_d = (R+PL_d) \cdot I_d^* - \omega L_q \cdot I_q^* \qquad (3)$$

This d-axis voltage command value $V_d^*$ is eventually a d-axis voltage command value obtained from the motor circuit equation (equation (3)).

The q-axis voltage command value computing section 52 includes a q-axis basic voltage value computing section 521 (basic voltage value computing unit), a q-axis non-interference control amount computing section 522, a q-axis adder section 523 (correcting unit), a first q-axis low-pass filter 524 (target electric current value smoothing unit, basic voltage value smoothing unit), and a second q-axis low pass filter 525 (electric current value smoothing unit, correction value smoothing unit). The q-axis non-interference control amount computing section 522 and the second q-axis low-pass filter 525 correspond to a correction value computing unit that obtains a smoothed correction value (q-axis non-interference control amount $D_q$).

The first q-axis low-pass filter 524 removes high-frequency components (high-frequency noise) of the q-axis target electric current value $I_q^*$. The first q-axis low-pass filter 524 may include, for example, a first-order lag element $(1/T_1 s+1))$ similar to the first d-axis low-pass filter 514.

The second q-axis low-pass filter 525 removes high-frequency components (high-frequency noise) of the d-axis target electric current value $I_d^*$. The second q-axis low-pass filter 525 may include, for example, a first-order lag element $(1/(T_2 s+1))$ similar to the second d-axis low-pass filter 515.

The q-axis basic voltage value computing section 521 computes a q-axis basic voltage value $V_{qbase}$ corresponding to a torque that should be generated from the motor 1 according to the following equation (4) based on the q-axis target electric current value $I_q^*$ smoothed by the first q-axis low-pass filter 524. $L_q$ represents a q-axis self-inductance, and is a known parameter.

$$V_{qbase}=(R+PL_q) \cdot I_q^* \qquad (4)$$

The q-axis non-interference control amount computing section 522 computes a q-axis non-interference control amount $D_q$ (correction value for correcting the q-axis basic voltage value $V_{qbase}$) according to the following equation (5) based on the d-axis target electric current value $I_d^*$ smoothed by the second q-axis low-pass filter 525 and the rotation angle speed ω obtained by the rotation angle speed computing section 23. φ represents √(3/2) times of maximum numbers of interlinkage fluxes of U-phase, V-phase, and W-phase armature coils, and is a known parameter.

$$D_q = \omega L_d \cdot I_d^* + \omega \phi \quad (5)$$

The q-axis adder section 523 obtains a q-axis voltage command value of the following equation (6) by adding the q-axis non-interference control amount $D_q$ to the q-axis basic voltage value $V_{qbase}$ (that is, correcting the q-axis basic voltage value $V_{qbase}$ by the q-axis non-interference control amount $D_q$).

$$V_q^* = V_{qbase} + D_q = (R + pL_q) \cdot I_q^* + \omega L_d \cdot I_d^* + \omega \phi \quad (6)$$

This q-axis voltage command value $V_q^*$ is eventually a q-axis voltage command value obtained from the motor circuit equation (equation (6)).

Figure 3:
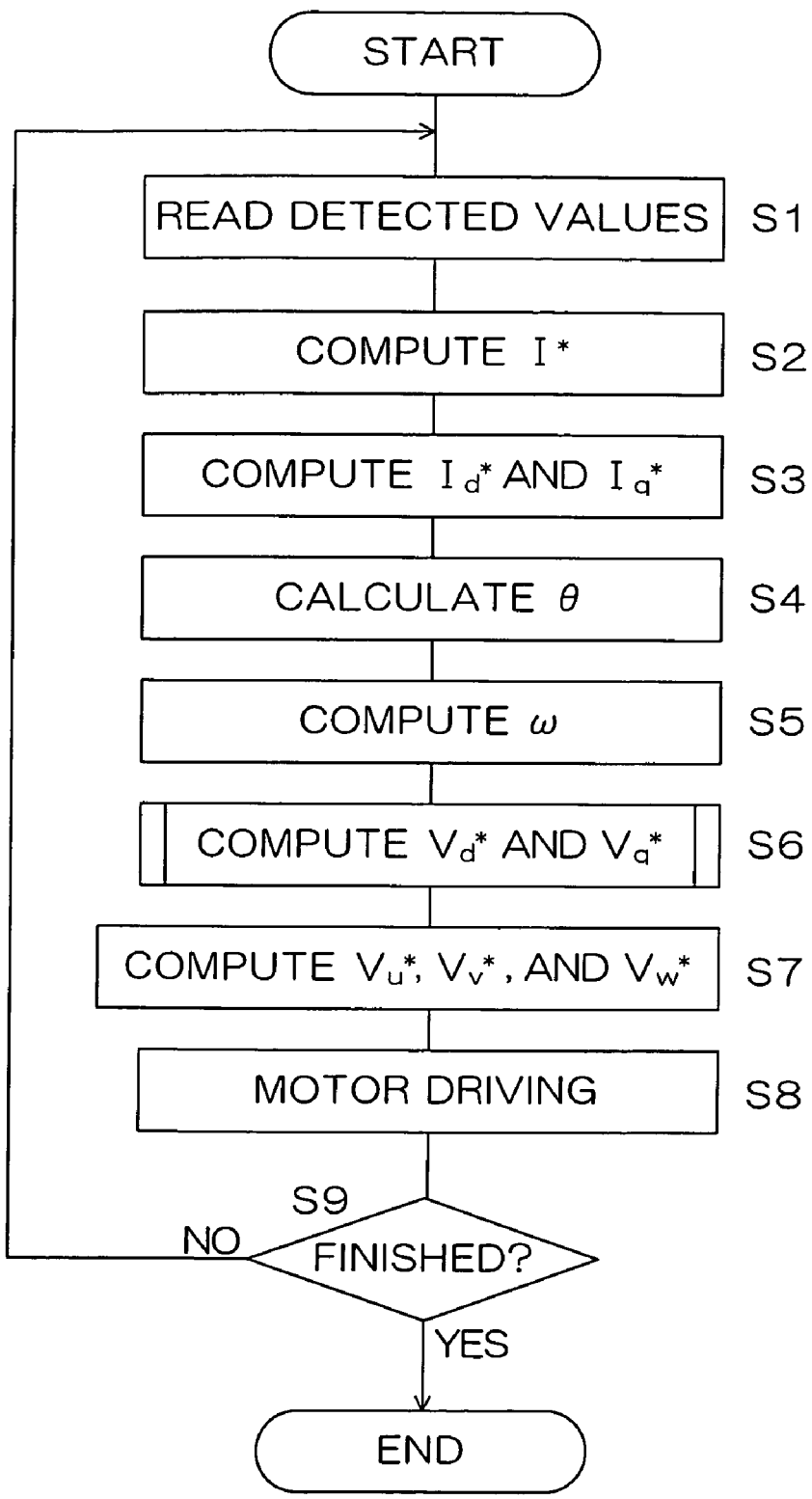
FIG. 3 is a flowchart for describing steps of controlling the motor by the motor control device.

FIG. 3 is a flowchart for describing steps of controlling the motor 1 by the motor control device 10. First, the microcomputer 12 reads values detected by the torque sensor 7, the vehicle speed sensor 8, and the resolver 2 (Step S1). The basic target electric current value computing section 15 computes a target electric current value I* based on the detected steering torque and vehicle speed (Step S2). The dq-axis target electric current value computing section 16 computes a d-axis target electric current value $I_d^*$ and a q-axis target electric current value $I_q^*$ corresponding to the target electric current value I* (Step S3). The angle calculating section 22 calculates a rotation angle θ of the rotor from the output of the resolver 2 (Step S4). The rotation angle speed computing section 23 computes a rotation angle speed ω based on the rotation angle θ calculated by the angle calculating section 22 (Step S5).

Next, in the dq-axis voltage command value computing section 19, a d-axis voltage command value $V_d^*$ and a q-axis voltage command value $V_q^*$ (may be voltage values that should be applied to the motor 1 or may be PWM duty values) are computed (Step S6). Then, in the voltage command value coordinate transformation section 20, applied voltage command values Vu*, Vv*, and Vw* to be applied to the U-phase armature coil, the V-phase armature coil, and the W-phase armature coil corresponding to the d-axis voltage command value $V_d^*$ and the q-axis voltage command value $V_q^*$ are computed (Step S7). PWM control signals corresponding to these applied voltage command values Vu*, Vv*, and Vw* are supplied to the driving circuit 13 from the PWM control section 21. Accordingly, the motor 1 is driven (Step S8). Then, it is determined whether the control is to be finished based on, for example, ON/OFF of an ignition switch (Step S9), and when the control is not to be finished, the process returns to Step S1.

Figure 4:
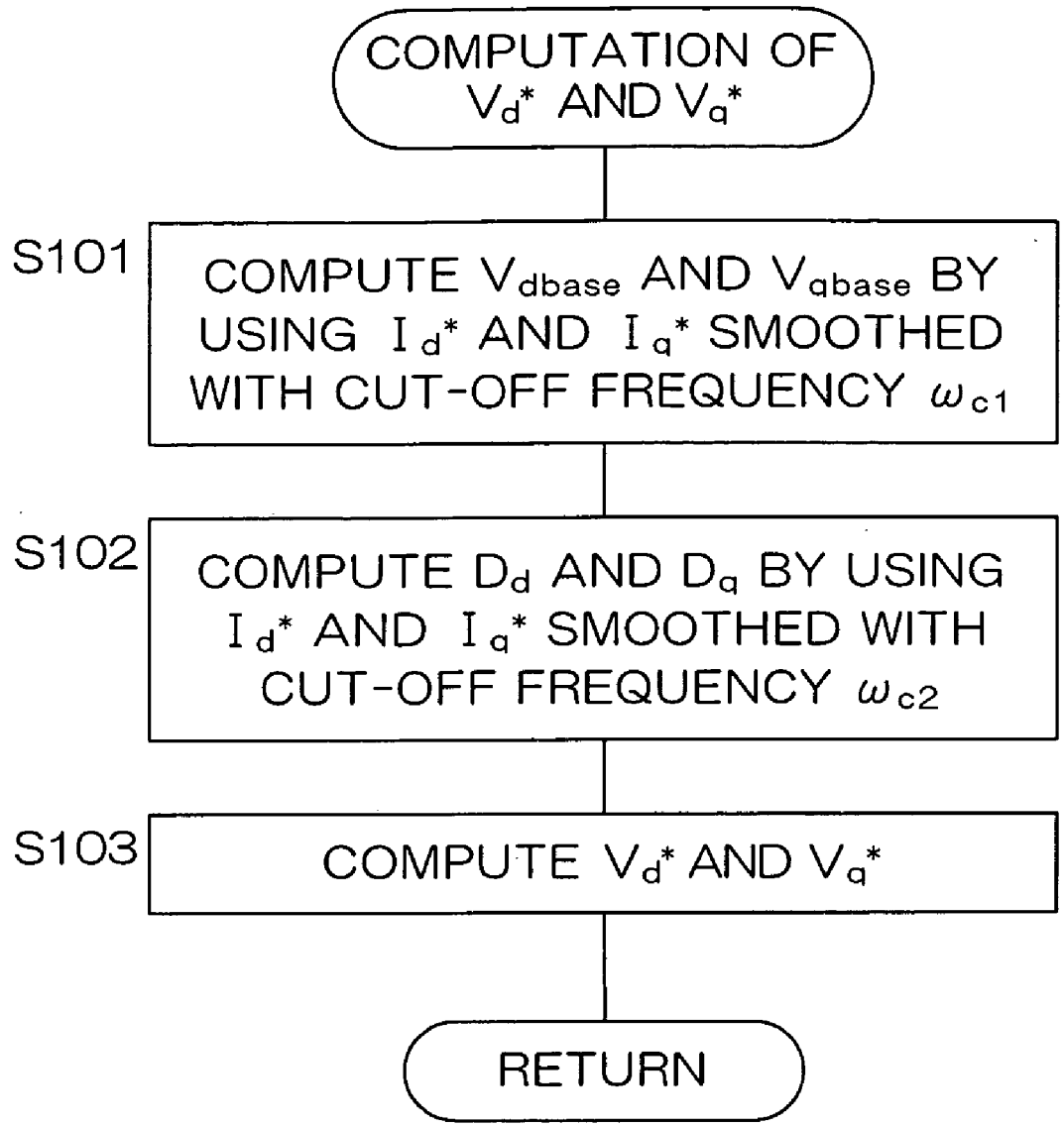
FIG. 4 is a flowchart showing steps of computing a d-axis voltage command value and a q-axis voltage command value.

FIG. 4 is a flowchart showing steps of computing a d-axis voltage command value $V_d^*$ and a q-axis voltage command value $V_q^*$. First, a d-axis basic voltage value $V_{dbase}$ is obtained by the d-axis basic voltage value computing section 511, and a q-axis basic voltage value $V_{qbase}$ is obtained by the q-axis basic voltage value computing section 521 (Step S101). At this time, the d-axis basic voltage value computing section 511 uses a d-axis target electric current value $I_d^*$ smoothed by the first d-axis low-pass filter 514 (cut-off frequency $\omega_{c1}$), and the q-axis basic voltage value computing section 521 uses a q-axis target electric current value $I_q^*$ smoothed by the first q-axis low-pass filter 524 (cut-off frequency $\omega_{c1}$)

On the other hand, in the d-axis non-interference control amount computing section 512, a d-axis non-interference control amount $D_d$ is obtained, and in the q-axis non-interference control amount computing section 522, a q-axis non-interference control amount $D_q$ is obtained (Step S102). At this time, the d-axis non-interference control amount computing section 512 uses a q-axis target electric current value $I_q^*$ smoothed by the second d-axis low-pass filter 515 (cut-off frequency $\omega_{c2} > \omega_{c1}$), and the q-axis non-interference control amount computing section 522 uses a d-axis target electric current value $I_d^*$ smoothed by the second q-axis low-pass filter 525 (cut-off frequency $\omega_{c2}$).

Then, a d-axis voltage command value $V_d^*$ is obtained by adding the d-axis non-interference control amount $D_d$ to the d-axis basic voltage value $V_{dbase}$ and a q-axis voltage command value $V_q^*$ is obtained by adding the q-axis non-interference control amount $D_q$ to the q-axis basic voltage value $V_{qbase}$ (Step S103). The d-axis voltage command value $V_d^*$ and the q-axis voltage command value $V_q^*$ thus obtained are output.

As described above, according to the present preferred embodiment, target electric current values $I_d^*$ and $I_q^*$ smoothed by the low-pass filters 514 and 524 are used for computing the basic voltage values $V_{dbase}$ and $V_{qbase}$ corresponding to a torque that should be generated from the motor 1, and target electric current values $I_q^*$ and $I_d^*$ smoothed by the low-pass filters 515 and 525 are used for computing the non-interference control amounts $D_d$ and $D_q$. Accordingly, vibrations and abnormal noise to be caused by high-frequency noise can be reduced. The cut-off frequency $\omega_{c1}$ of the low-pass filters 514 and 524 that smooth the target electric current values $I_d^*$ and $I_q^*$ to be used for computations of the basic voltage values $V_{dbase}$ and $V_{qbase}$ is set to be comparatively low, so that high-frequency components contained in the target electric current values $I_d^*$ and $I_q^*$ can be sufficiently removed, and unpleasant vibrations and abnormal noise can be effectively reduced. On the other hand, the cut-off frequency $\omega_{c2}$ of the low-pass filters 515 and 525 that smooth the target electric current values $I_q^*$ and $I_d^*$ to be used for computations of the non-interference control amounts $D_d$ and $D_q$ is set to be comparatively high. This is for making the non-interference control amounts $D_d$ and $D_q$ follow fluctuations of the rotation angle speed ω with sufficient responsiveness. Accordingly, the effect obtained from non-interference control in which the responsiveness of the motor 1 can be stabilized without depending on the rotation angle speed ω and the electric current values is not blocked. Specifically, without greatly sacrificing the responsiveness of non-interference control, high-frequency noise can be removed and vibrations and abnormal noise can be reduced or prevented from occurring.

Figure 5:
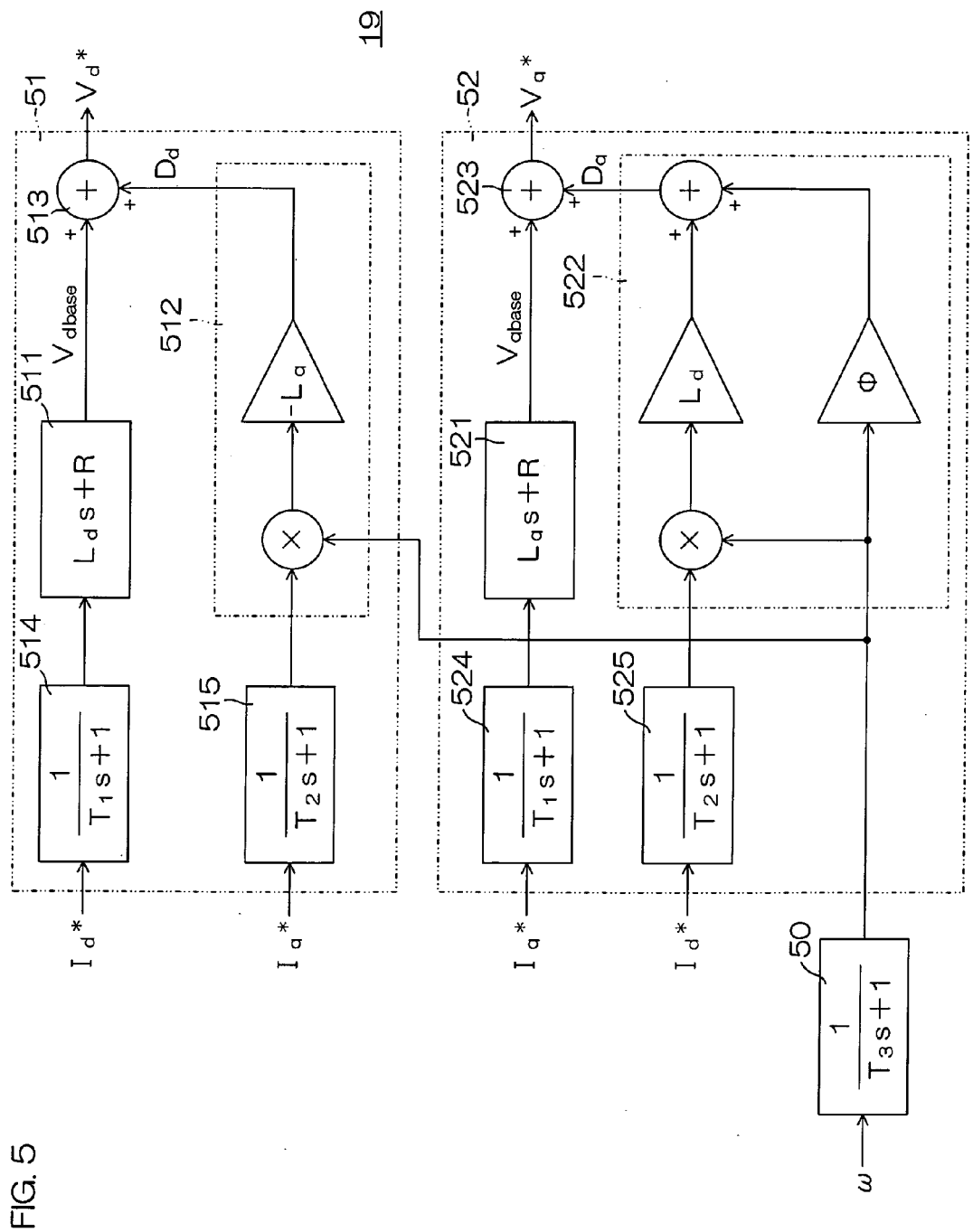
FIG. 5 is a block diagram showing a configuration of a dq-axis voltage command value computing section in a motor control device according to a second preferred embodiment of the present invention.

FIG. 5 is a block diagram for describing a configuration of a motor control device according to a second preferred embodiment of the present invention, showing a configuration that can be used as the dq-axis voltage command value computing section 19 in the configuration of FIG. 1 described above. Hereinafter, description is given by referring to FIG. 1 again. In FIG. 5, components corresponding to the components shown in FIG. 2 are designated by the same reference numerals.

In this preferred embodiment, in addition to the configuration shown in FIG. 2 described above, an angle speed low-pass filter 50 for smoothing the rotation angle speed ω computed by the rotation angle speed computing section 23 is provided. The rotation angle speed ω smoothed by this angle speed low-pass filter 50 is used for computations of non-interference control amounts $D_d$ and $D_q$ in the non-interference control amount computing sections 512 and 522.

The angle speed low-pass filter 50 may include, for example, a first-order lag element ($1/(T_3s+1)$). $T_3$ is a time constant. The cut-off frequency $\omega_{c3} = 1/T_3$. The cut-off frequency $\omega_{c3}$ is preferably determined to be a value not less than an eigenfrequency determined according to mechanical characteristics (system characteristics) of the electric power steering apparatus. Accordingly, high-frequency noise can be removed while securing responsiveness to fluctuations of the rotation angle speed ω.

For example, when the transmission function of the electric power steering device is expressed by the following equation (7), the eigenfrequency is expressed by the following equation (8).

$$1/\{M \cdot n^2 \cdot s^2 + C \cdot s + K\} \quad (7)$$

$$\sqrt{\{K/(M \cdot n^2)\}} \quad (8)$$

Here, M represents an inertia moment of the rotor of the motor, n represents a reduction ratio, C represents a friction coefficient, and K represents an elastic modulus of torsion bar. The reduction ratio n is of a reduction gear (not shown) between the motor 1 and the steering mechanism 3. The torsion bar is interposed in the middle of the steering shaft and generates torsion corresponding to a steering torque. The torsion of the torsion bar is detected by the torque sensor 7.

Thus, in the present preferred embodiment, by determining the cut-off frequency $\omega_{c3}$ based on the system characteristics (inertia, viscosity, and elasticity), minimal smoothing is applied to the rotation angle speed ω. Accordingly, both of the system stabilization by reduction of vibrations and abnormal noise and securement of responsiveness to the rotation angle speed ω can be realized.

Figure 6:
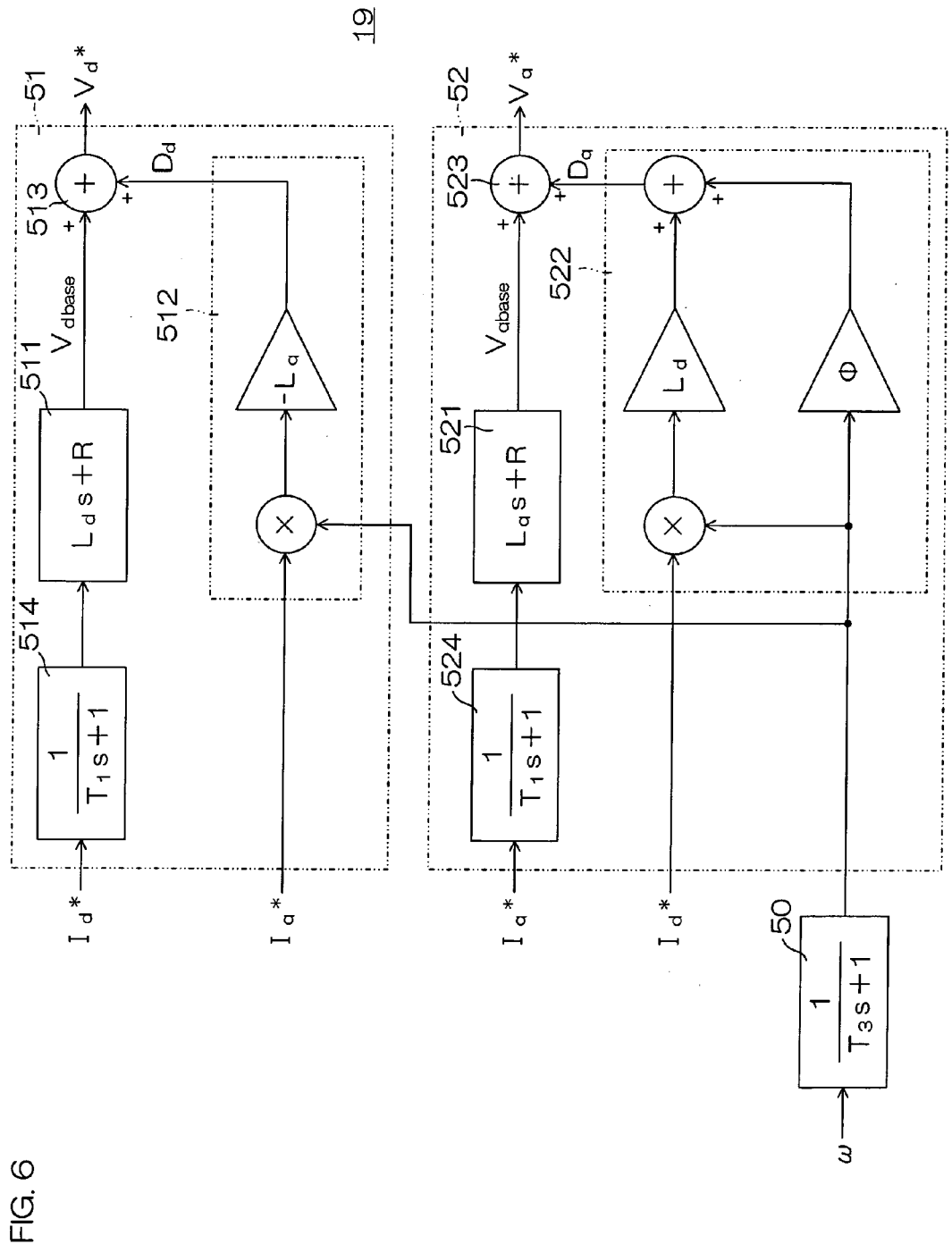
FIG. 6 is a block diagram showing a configuration of a dq-axis voltage command value computing section in a motor control device according to a third preferred embodiment of the present invention.

FIG. 6 is a block diagram for describing a configuration of a motor control device according to a third preferred embodiment of the present invention, showing a configuration that can be used as the dq-axis voltage command value computing section 19 in the configuration of FIG. 1 described above. In FIG. 6, components corresponding to the components shown in FIG. 5 are designated by the same reference numerals.

In the present preferred embodiment, from the configuration (FIG. 5) of the second preferred embodiment, the low-pass filters 515 and 525 for smoothing the target electric current values $I_d^*$ and $I_q^*$ to be used for computations in the non-interference control amount computing sections 512 and 522 are omitted. That is, smoothing is applied to only the rotation angle speed ω among variables to be used for computations of non-interference control amounts $D_d$ and $D_q$.

Even with this configuration, high-frequency noise in the rotation angle speed ω can be removed, vibrations can be reduced, and responsiveness of the non-interference control amounts $D_d$ and $D_q$ can be secured.

Figure 7:
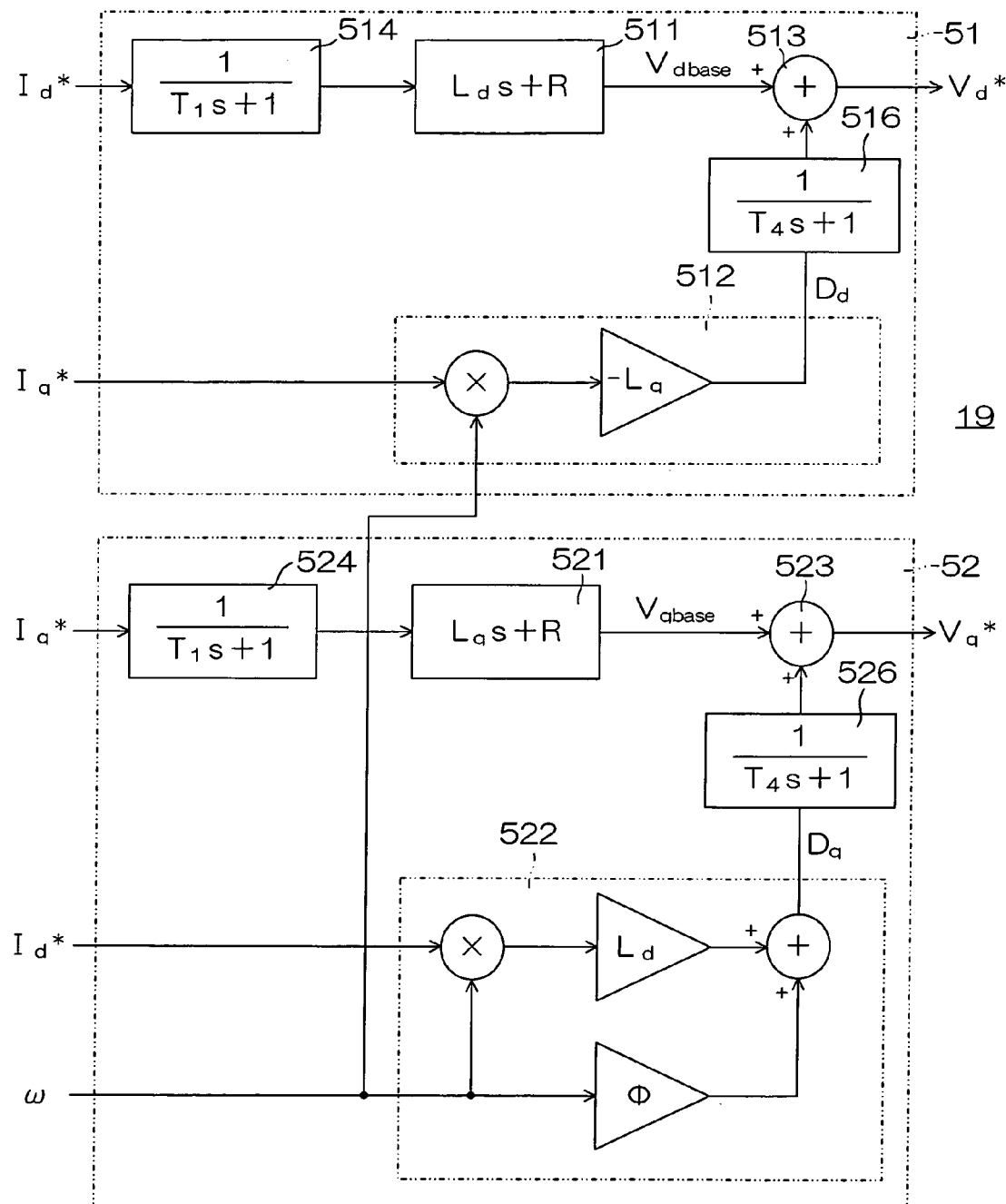
FIG. 7 is a block diagram showing a configuration of a dq-axis voltage command value computing section in a motor control device according to a fourth preferred embodiment of the present invention.

FIG. 7 is a block diagram for describing a configuration of a motor control device according to a fourth preferred embodiment of the present invention, showing a configuration that can be used as the dq-axis voltage command value computing section 19 in the configuration of FIG. 1. In FIG. 7, components corresponding to the components shown in FIG. 2 are designated by the same reference numerals.

In the present preferred embodiment, the low-pass filters 515 and 525 for smoothing the target electric current values $I_d^*$ and $I_q^*$ to be used for computations in the non-interference control amount computing sections 512 and 522 are omitted, and further, the low-pass filter 50 for smoothing the rotation angle speed ω is also omitted. Instead, a third d-axis low-pass filter 516 and a third q-axis low-pass filter 526 for entirely smoothing the non-interference control amounts $D_d$ and $D_q$ are provided. A d-axis non-interference control amount $D_d$ smoothed by the third d-axis low-pass filter 526 is added to the d-axis basic voltage value $V_{dbase}$ by the d-axis adder section 513. Similarly, a q-axis non-interference control amount $D_q$ smoothed by the third q-axis low pass filter 526 is added to the q-axis basic voltage value $V_{qbase}$ by the q-axis adder section 523.

Each of the low-pass filters 516 and 526 may include a first-order lag element ($1/(T_4 s+1)$). $T_4$ represents a time constant, and the cut-off frequency $\omega_{c4}=1/T_4$. This cut-off frequency $\omega_{c4}$ is determined to be equivalent to the cut-off frequency $\omega_{c2}$ of the second d-axis and second q-axis low-pass filters 515 and 525 or the cut-off frequency $\omega_{c3}$ of the angle speed low-pass filter 50.

Even with this configuration, while the non-interference control amounts $D_d$ and $D_q$ are made to follow fluctuations of the rotation angle speed ω, high-frequency noise can be removed and vibrations and abnormal noise can be reduced.

Figure 8:
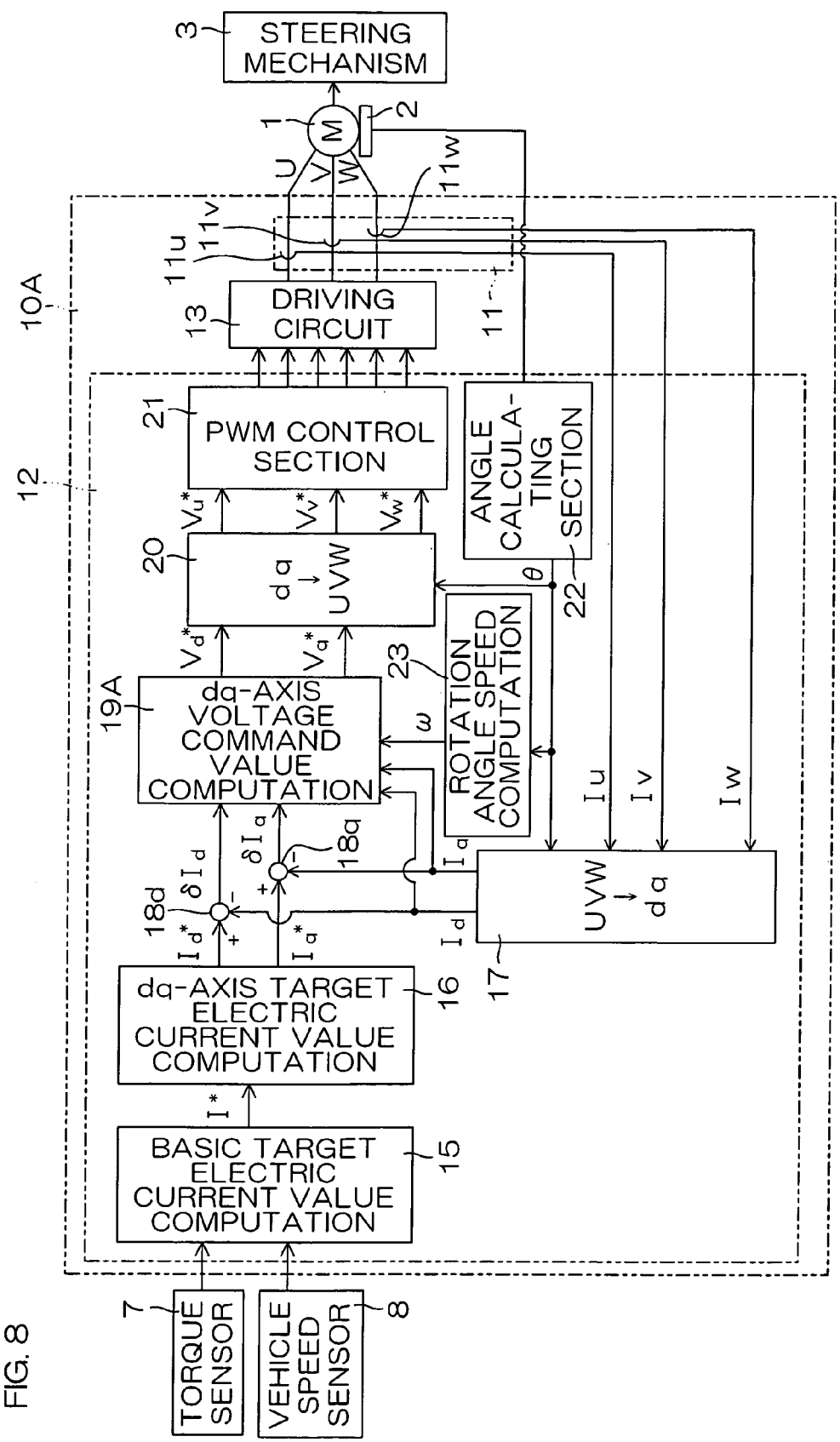
FIG. 8 is a block diagram for describing an electric configuration of an electric power steering apparatus to which a motor control device according to a fifth preferred embodiment of the present invention is applied.

FIG. 8 is a block diagram for describing an electric configuration of an electric power steering apparatus to which a motor control device according to a fifth preferred embodiment of the present invention is applied. In FIG. 8, components corresponding to the components shown in FIG. 1 are designated by the same reference numerals, and detailed description thereof is omitted.

The motor control devices 10 according to the first to fourth preferred embodiments perform open loop control operation to set a d-axis voltage command value $V_d^*$ and a q-axis voltage command value $V_q^*$ based on the motor circuit equations, and on the other hand, the motor control device 10A of the present preferred embodiment is arranged to detect motor electric current values actually flowing in the motor 1 and perform feedback control based on the detected motor electric current values (detected electric current values).

In detail, in this preferred embodiment, the motor control device 10A includes an electric current detecting section 11, a microcomputer 12, and a driving circuit 13.

The electric current detecting section 11 detects electric currents flowing in the armature coils of the motor 1. In detail, the electric current detecting section 11 includes electric current detectors 11$u$, 11$v$, and 11$w$ that detect phase electric currents in the armature coils of three phases (the U phase, the V phase, and the W phase).

The microcomputer 12 includes a basic target electric current value computing section 15, a dq-axis target electric current computing section 16, a dq-axis electric current computing section 17, a d-axis deviation computing section 18$d$, a q-axis deviation computing section 18$q$, a dq-axis voltage command value computing section 19A (feedback control unit), a voltage command value coordinate transformation section 20, a PWM control section 21, an angle calculating section 22, and a rotation angle speed computing section 23. These are functional processing sections that are realized by software to be executed by the microcomputer 12.

The electric current detectors 11$u$, 11$v$, and 11$w$ detect phase electric currents Iu, Iv, and Iw flowing between the driving circuit 13 and the armature coils of the phases of the motor 1.

The phase electric currents Iu, Iv, and Iw output from the electric current detecting section 11 are input into the dq-axis electric current computing section 17. By coordinate-transforming the phase electric currents Iu, Iv, and Iw based on a rotation angle θ calculated by the angle calculating section 22, the dq-axis electric current computing section 17 computes a d-axis electric current value $I_d$ and a q-axis electric current value $I_q$ (detected electric current values as motor electric current values). Computations in the dq-axis electric current value computing section 17 can be performed by using known computing equations.

The d-axis deviation computing section 18$d$ obtains a d-axis deviation $\delta I_d$ between the d-axis target electric current value $I_d^*$ and the d-axis electric current $I_d$. Similarly, the q-axis deviation computing section 18$q$ obtains a q-axis deviation $\delta I_q$ between the q-axis target electric current value $I_q^*$ and the q-axis electric current $I_q$.

The dq-axis voltage command value computing section 19A obtains a d-axis voltage command value $V_d^*$ corresponding to the d-axis deviation $\delta I_d$ and a q-axis voltage command value $V_q^*$ corresponding to the q-axis deviation $\delta I_q$.

Figure 9:
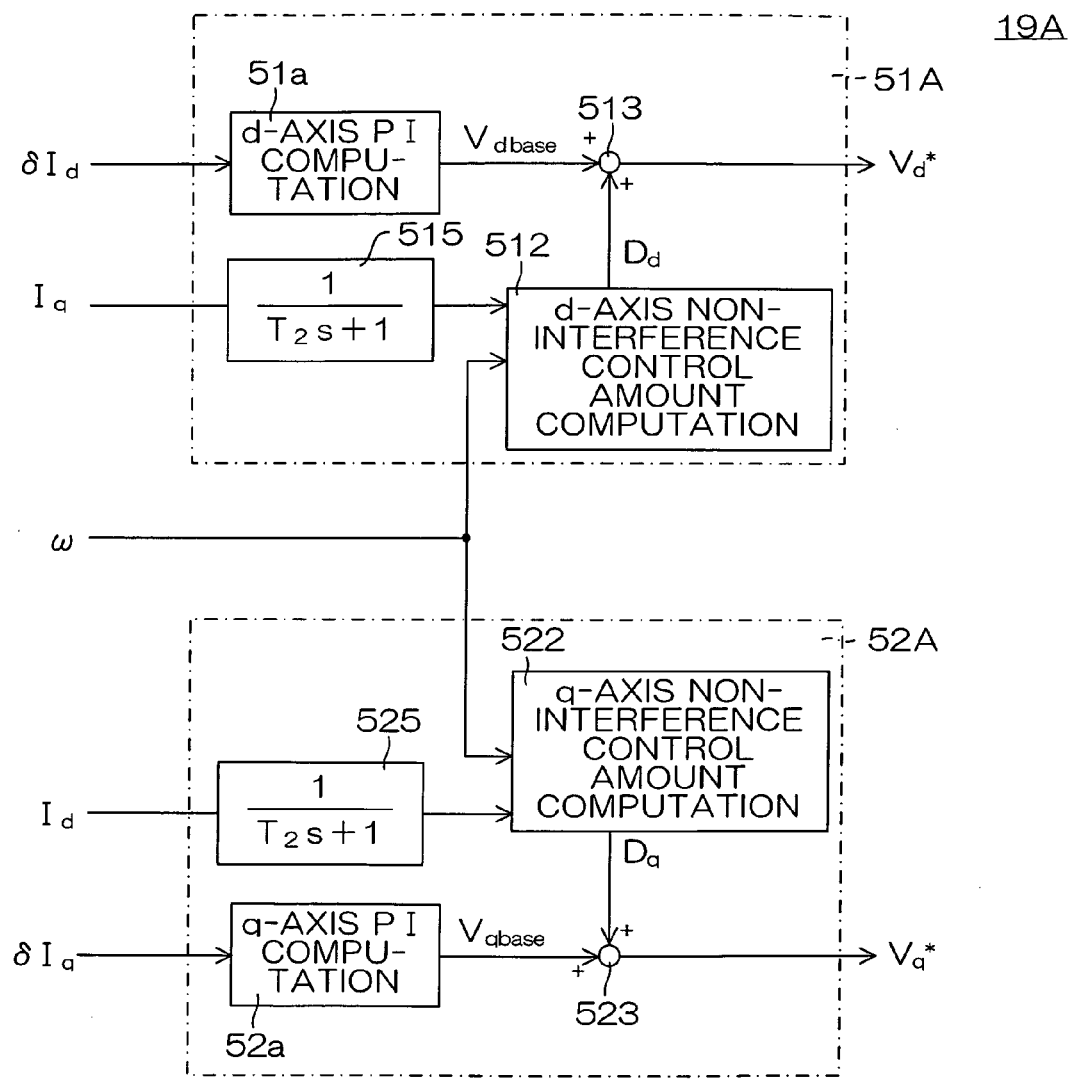
FIG. 9 is a block diagram for describing a detailed configuration of a dq-axis voltage command value computing section in the fifth preferred embodiment.

FIG. 9 is a block diagram for describing a detailed configuration of the dq-axis voltage command value computing section 19A. In FIG. 9, components corresponding to the components shown in FIG. 2 are designated by the same reference numerals.

The dq-axis voltage command value computing section 19A includes a d-axis voltage command value computing section 51A and a q-axis voltage command value computing section 52A. The d-axis voltage command value computing section 51A obtains a d-axis voltage command value $V_d^*$ based on PI computation of the d-axis deviation $\delta I_d$ (hereinafter, referred to as "d-axis PI computation"), etc., so as to reduce the d-axis deviation $\delta_d$. The q-axis voltage command value computing section 52A obtains a q-axis voltage command value $V_q^*$ based on PI computation of the q-axis deviation $\delta I_q$ (hereinafter, referred to as "q-axis PI computation"), etc., so as to reduce the q-axis deviation $\delta I_q$.

The d-axis voltage command value computing section 51A includes a d-axis PI computing section 51a, a d-axis non-interference control amount computing section 512, a d-axis adder section 513, and a d-axis low-pass filter 515. Specifically, the difference from the d-axis voltage command value computing section 51 of the first preferred embodiment is that the first d-axis low-pass filter 514 is not provided, and the d-axis PI computing section 51a is provided instead of the d-axis basic voltage value computing section 511. However, in the present preferred embodiment, for computation of the d-axis non-interference control amount $D_d$, the q-axis electric current value $I_q$ computed by the dq-axis electric current computing section 17 is used. Specifically, the d-axis low-pass filter 515 smoothes the q-axis electric current value $I_q$, and the smoothed q-axis electric current value $I_q$ is used for computation in the d-axis non-interference control amount computing section 512. Therefore, the d-axis non-interference control amount $D_d$ is expressed as $D_d = -\omega L_q \cdot I_q$.

The d-axis PI computing section 51a computes a d-axis basic voltage value $V_{dbase}$ by PI computation of the d-axis deviation $\delta I_d$, and outputs this d-axis basic voltage value $V_{dbase}$ to the d-axis adder section 513. The d-axis adder section 513 obtains a d-axis voltage command value $V_d^*$ by adding the d-axis non-interference control amount $D_d$ to the d-axis basic voltage value $V_{dbase}$.

The q-axis voltage command value computing section 52A includes a q-axis PI computing section 52a, a q-axis non-interference control amount computing section 522, a q-axis adder section 523, and a q-axis low-pass filter 525. Specifically, the difference from the q-axis voltage command value computing section 52 of the first preferred embodiment is that the first q-axis low-pass filter 524 is not provided, and the q-axis PI computing section 52a is provided instead of the q-axis basic voltage value computing section 521. However, in the present preferred embodiment, for computation of the q-axis non-interference control amount $D_q$, the d-axis electric current value $I_d$ computed by the dq-axis electric current computing section 17 is used. Specifically, the q-axis low-pass filter 525 smoothes the d-axis electric current value $I_d$, and the smoothed d-axis electric current value $I_d$ is used for computation in the q-axis non-interference control amount computing section 522. Therefore, the q-axis non-interference control amount $D_q$ is expressed as $D_q = \omega L_d \cdot I_d + \omega \phi$.

The q-axis PI computing section 52a computes a q-axis basic voltage value $V_{qbase}$ by PI computation of the q-axis deviation $\delta I_q$, and outputs this q-axis basic voltage value $V_{qbase}$ to the q-axis adder section 523. The q-axis adder section 523 obtains a q-axis voltage command value $V_q^*$ by adding the q-axis non-interference control amount $D_q$ to the q-axis basic voltage value $V_{qbase}$.

Each of the PI computing sections 51a and 52a includes a proportional element and an integral element. Out of these, the integral element acts to smooth the deviations $\delta I_d$ and $\delta I_q$. Accordingly, high-frequency noise in the target electric current values $I_d^*$ and $I_q^*$ and detected electric current values $I_d$ and $I_q$ can be removed. Therefore, it is not necessary to apply smoothing to the electric current values $I_d^*$, $I_q^*$, $I_d$, and $I_q$ to be used for computations of the basic voltage values $V_{dbase}$ and $V_{qbase}$. The cut-off frequency for smoothing by the integral element can be adjusted by adjusting a proportional gain and an integral gain.

According to this configuration, as in the case of the first preferred embodiment, responsiveness to the rotation angle speed $\omega$ is secured, and without blocking the effect of non-interference control, vibrations and abnormal noise can be reduced.

Figure 10:
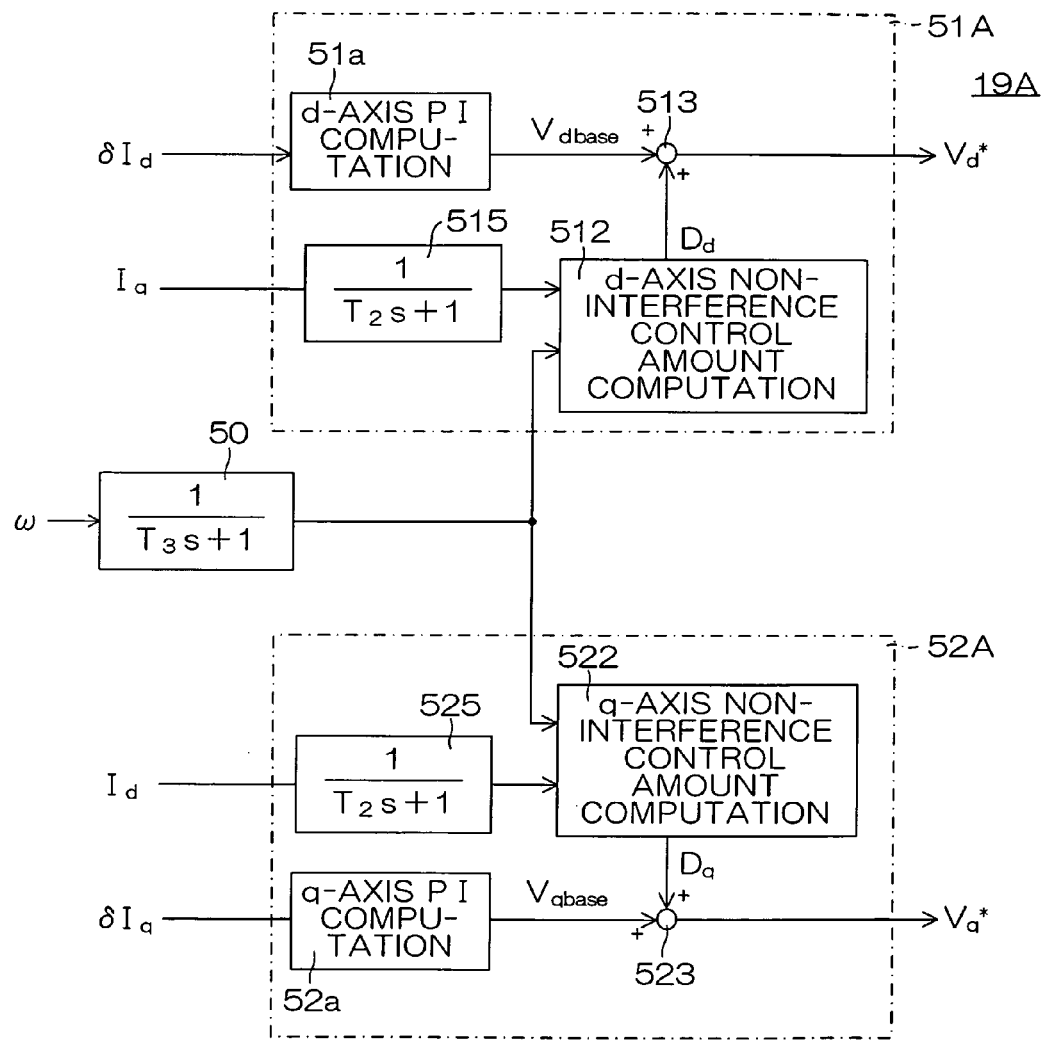
FIG. 10 is a block diagram showing another configuration of the dq-axis voltage command value computing section.
Figure 11:
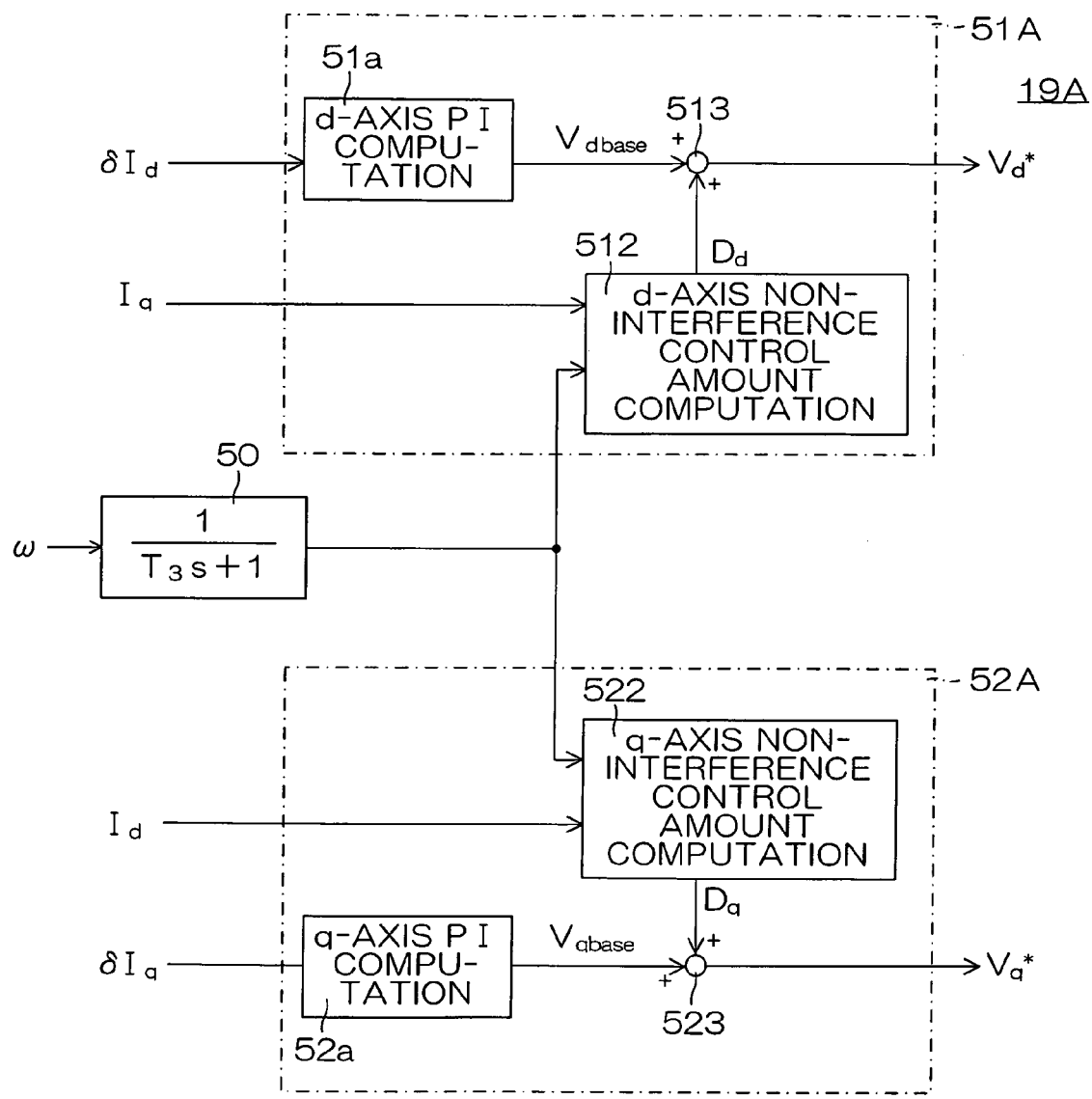
FIG. 11 is a block diagram showing still another configuration of the dq-axis voltage command value computing section.
Figure 12:
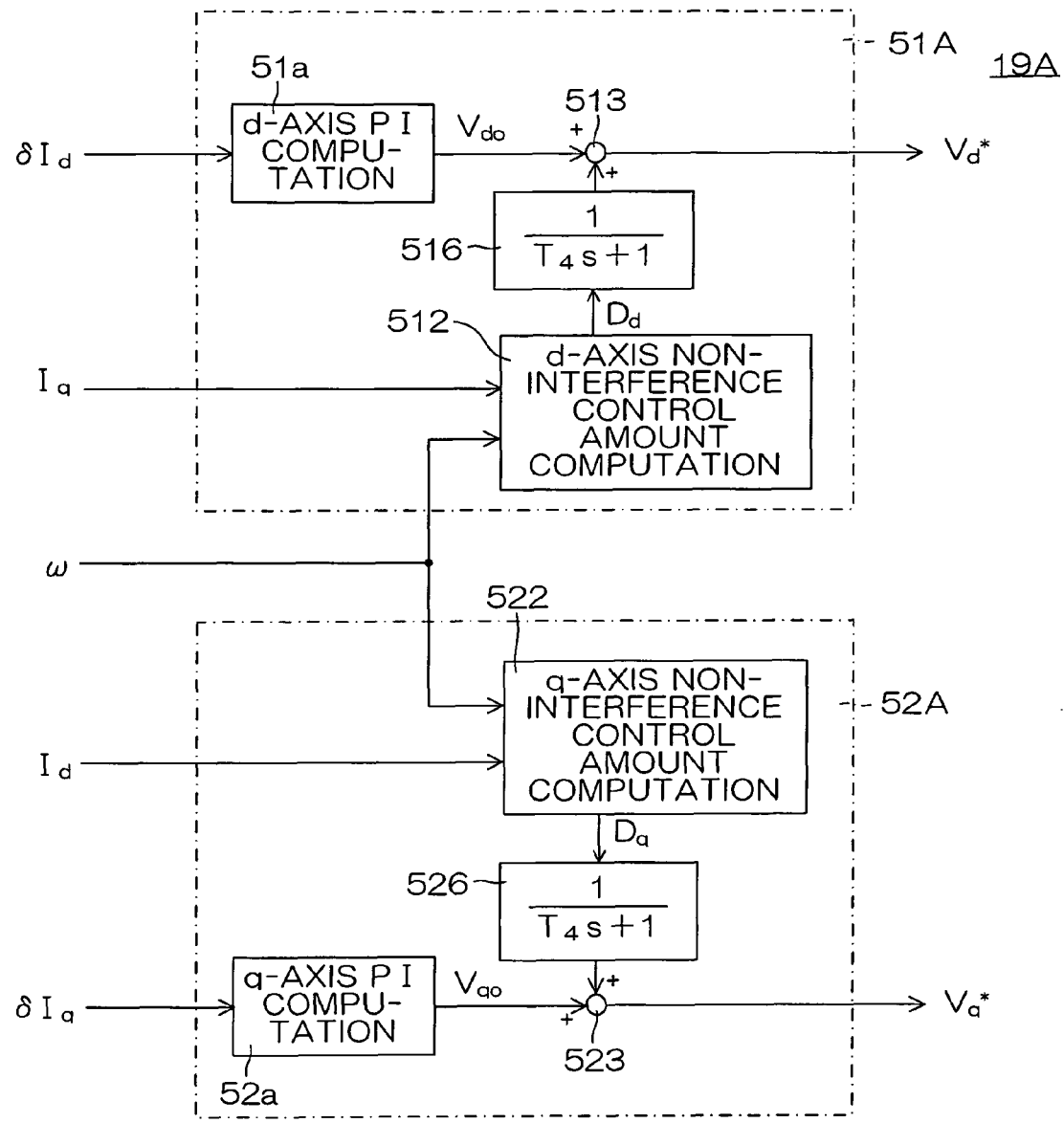
FIG. 12 is a block diagram showing still another configuration of the dq-axis voltage command value computing section.

The fifth preferred embodiment can be varied similarly to the second and third preferred embodiments. Specifically, as shown in FIG. 10, in addition to the configuration shown in FIG. 9, an angle speed low-pass filter 50 for smoothing the rotation angle speed $\omega$ may be provided. As shown in FIG. 11, from the configuration shown in FIG. 10, the low-pass filters 515 and 525 for smoothing detected electric current values $I_d$ and $I_q$ to be used for computations of non-interference control amounts $D_d$ and $D_q$ may be omitted. Further, as shown in FIG. 12, instead of the low-pass filters 515, 525, and 50, low-pass filters 516 and 526 for entirely smoothing the non-interference control amounts $D_d$ and $D_q$ may be provided.

Although some preferred embodiments of the present invention are described above, the present invention can also be carried out in other preferred embodiments. For example, in the first to fourth preferred embodiments, the target electric current values $I_d^*$ and $I_q^*$ to be used for determining the basic voltage values $V_{dbase}$ and $V_{qbase}$ are smoothed by the low-pass filters 514 and 524; however, these may be omitted and only smoothing of the non-interference control amounts $D_d$ and $D_q$ may be performed instead.

In the preferred embodiments described above, an example in which the present invention is applied to a motor as a drive source of an electric power steering apparatus is described; however, the present invention is also applicable to control of motors for applications other than the electric power steering apparatus. In particular, application to motor torque control in a servo system for which responsiveness and following capability are required is effective.

Preferred embodiments of the present invention are only detailed examples used for clarifying the technical contents of the present invention, and the present invention should not be limited to these detailed examples, and the spirit and scope of the present invention are limited only by the claims attached hereto.

The present application corresponds to Japanese Patent Application No. 2008-92801 filed in the Japanese Patent Office on Mar. 31, 2008, the whole disclosure of which is incorporated herein by reference.

What is claimed is:

1. A motor control device comprising:
   a target electric current value setting unit configured to set a target electric current value to be supplied to a motor;

a basic voltage value computing unit configured to compute a basic voltage value for driving the motor based on the target electric current value set by the target electric current value setting unit;

a rotation angle speed computing unit configured to compute a rotation angle speed of the motor;

a correction value computing unit configured to compute a correction value for correcting the basic voltage value based on the motor electric current value and the rotation angle speed computed by the rotation angle speed computing unit;

a correcting unit configured to obtain a voltage command value by correcting the basic voltage value computed by the basic voltage value computing unit based on the correction value computed by the correction value computing unit; and a driving unit configured to drive the motor based on the voltage command value obtained by the correcting unit;

wherein the correction value computing unit includes a correction value smoothing unit configured to obtain a smoothed correction value; and wherein the basic voltage value computing unit further includes a basic voltage value smoothing unit configured to obtain a smoothed basic voltage value.

2. The motor control device according to claim 1, wherein the correction value computing unit is configured to compute a correction value for non-interference control of the motor.

3. The motor control device according to claim 2, wherein;

the basic voltage value computing unit is configured to compute a d-axis basic voltage value $V_{dbase}$ and a q-axis basic voltage value $V_{qbase}$, the correction value computing unit is configured to compute a d-axis correction value $D_d$ for correcting the d-axis basic voltage value $V_{dbase}$ according to a following equation A2, and to compute a q-axis correction value $D_q$ for correcting the q-axis basic voltage value $V_{qbase}$ according to a following equation B2, and the voltage command values $V_d^*$ and $V_q^*$ are expressed by following equations A and B:

$$V_d^* = V_{dbase} + D_d \quad (A)$$

$$V_q^* = V_{dbase} + D_q \quad (B)$$

$$D_d = -\omega L_q \cdot I_q^* \quad (A2)$$

$$D_q = \omega L_d \cdot I_d^* + \omega \phi \quad (B2)$$

provided that R represents an armature coil resistance ($\Omega$), P represents a differential operator, $\omega$ represents a rotation angle speed (rad/sec) of the motor, $L_d$ represents a d-axis self-inductance (H), $L_q$ represents a q-axis self-inductance (H), $I_d^*$ represents a d-axis target electric current value (A), $I_q^*$ represents a q-axis target electric current value (A), and $\phi$ represents $\sqrt{(3/2)}$ times of maximum numbers of interlinkage fluxes of U-phase, V-phase, and W-phase armature coils.

4. The motor control device according to claim 3, wherein the basic voltage value computing unit is configured to compute a d-axis basic voltage value $V_{dbase}$ and a q-axis basic voltage value $V_{qbase}$ according to following equations A1 and B1:

$$V_{dbase} = (R + PL_d) \cdot I_d^* \quad (A1)$$

$$V_{qbase} = (R + PL_q) \cdot I_q^* \quad (B1).$$

5. The motor control device according to claim 1, wherein the basic voltage value computing unit and the correction value computing unit constitute an open-loop control operation unit configured to obtain a basic voltage value and a correction value based on a motor circuit equation.

6. The motor control device according to claim 2, further comprising:

an electric current detecting unit configured to detect a motor electric current value and to generate a motor electric current detected value, wherein the basic voltage value computing unit is configured to compute a d-axis basic voltage value $V_{dbase}$ and a q-axis basic voltage value $V_{qbase}$, the correction value computing unit is configured to compute a d-axis correction value $D_d$ for correcting the d-axis basic voltage value $V_{dbase}$ according to a following equation A3, and to compute a q-axis correction value $D_q$ for correcting the q-axis basic voltage value $V_{qbase}$ according to a following equation B3, and the voltage command values $V_d^*$ and $V_q^*$ are expressed by following equations A and B:

$$V_d^* = V_{dbase} + D_d \quad (A)$$

$$V_q^* = V_{dbase} + D_q \quad (B)$$

$$D_d = -\omega L_q \cdot I_q \quad (A3)$$

$$D_q = \omega L_d \cdot I_d + \omega \phi \quad (B3)$$

provided that R represents an armature coil resistance ($\Omega$), P represents a differential operator, $\omega$ represents a rotation angle speed (rad/sec) of the motor, $L_d$ represents a d-axis self-inductance (H), $L_q$ represents a q-axis self-inductance (H), $I_d$ represents a d-axis motor electric current detected value (A), $I_q$ represents a q-axis motor electric current detected value (A), and $\phi$ represents $\sqrt{(3/2)}$ times of maximum numbers of interlinkage fluxes of U-phase, V-phase, and W-phase armature coils.

7. The motor control device according to claim 1, wherein a cut-off frequency of the basic voltage value smoothing unit is lower than a cut-off frequency of the correction value smoothing unit.

8. The motor control device according to claim 1, wherein the basic voltage value smoothing unit includes a target electric current value smoothing unit configured to smooth the target electric current value set by the target electric current value setting unit.

9. The motor control device according to claim 1, wherein the correction value smoothing unit includes an electric current value smoothing unit configured to smooth the motor electric current value.

10. The motor control device according to claim 1, wherein the correction value smoothing unit includes a rotation angle speed smoothing unit configured to smooth the rotation angle speed computed by the rotation angle speed computing unit.

* * * * *